(12) United States Patent
Wanek

(10) Patent No.: US 8,397,924 B2
(45) Date of Patent: Mar. 19, 2013

(54) DRUM FRAME SYSTEM FOR CRANES

(75) Inventor: Michael J. Wanek, Two Rivers, WI (US)

(73) Assignee: Manitowoc Crane Companies, LLC, Manitowoc, WI (US)

( * ) Notice: Subject to any disclaimer, the term of this patent is extended or adjusted under 35 U.S.C. 154(b) by 814 days.

(21) Appl. No.: 12/561,094

(22) Filed: Sep. 16, 2009

(65) Prior Publication Data

US 2010/0072158 A1    Mar. 25, 2010

Related U.S. Application Data

(60) Provisional application No. 61/098,632, filed on Sep. 19, 2008, provisional application No. 61/155,401, filed on Feb. 25, 2009.

(51) Int. Cl.
*B66C 23/26* (2006.01)

(52) U.S. Cl. .......................... 212/175; 212/179; 254/279

(58) Field of Classification Search .................. 212/175, 212/178, 179; 254/278, 279, 280
See application file for complete search history.

(56) References Cited

U.S. PATENT DOCUMENTS

| | | | |
|---|---|---|---|
| 3,955,684 A | | 5/1976 | Novotny |
| 3,977,530 A | * | 8/1976 | Helm et al. .................... 212/175 |
| 4,081,081 A | * | 3/1978 | Morrow et al. ................ 212/178 |
| 4,273,244 A | | 6/1981 | Jensen et al. |
| 4,582,205 A | | 4/1986 | Berger et al. |
| 5,443,169 A | * | 8/1995 | Pagel et al. .................... 212/298 |
| 5,484,069 A | * | 1/1996 | Lanning ........................ 212/270 |
| 6,062,405 A | * | 5/2000 | Pech et al. ..................... 212/298 |
| 6,089,388 A | | 7/2000 | Willim |
| 6,131,751 A | * | 10/2000 | Pech et al. ..................... 212/178 |
| 6,481,202 B1 | * | 11/2002 | Zuehlke et al. ................. 60/464 |
| 6,588,521 B1 | * | 7/2003 | Porubcansky et al. ......... 180/9.1 |
| 6,702,132 B1 | * | 3/2004 | Moore et al. ................... 212/270 |
| 7,007,764 B2 | * | 3/2006 | Smith et al. ..................... 180/9.1 |
| 7,762,412 B2 | * | 7/2010 | Porubcansky ................ 212/299 |
| 2007/0256999 A1 | | 11/2007 | Kurotsu et al. |
| 2008/0099421 A1 | | 5/2008 | Pech et al. |
| 2008/0203045 A1 | | 8/2008 | Pech et al. |
| 2008/0264887 A1 | | 10/2008 | Porubcansky |

OTHER PUBLICATIONS

Liebherr LR11350—four photographs of load, boom and mast hoist drum mounting (undated but prior to Sep. 16, 2009).
Manitowoc 16000—three photographs of load and mast hoist drums (undated but prior to Sep. 16, 2009).
Pages from "LR1600/2 Crawler Crane—Technical Data," Liebherr, pp. 1-10 (undated but prior to Sep. 16, 2009).
Brochure for Manitowoc 4100 Crane, 1 page (undated but prior to Sep. 16, 2009).
U.S. Appl. No. 12/561,007, filed Sep. 16, 2009.

* cited by examiner

*Primary Examiner* — Emmanuel M Marcelo
(74) *Attorney, Agent, or Firm* — Steven P. Shurtz; Brinks Hofer Gilson & Lione

(57) ABSTRACT

A mobile lift crane includes a carbody having moveable ground engaging members; a rotating bed rotatably connected to the carbody such that the rotating bed can swing with respect to the ground engaging members; a boom pivotally mounted on the rotating bed; a first hoist drum mounted in a first frame connected to the rotating bed; a second hoist drum mounted in a second frame connected to the rotating bed; and a third hoist drum mounted in a third frame indirectly connected to the rotating bed by being connected to at least one of the first and second hoist drum frames. Preferably load hoist drum frames are connected to the rotating bed by removable pins, the hoist drum and frame thus being detachable from the rotating bed as a combined unit. Further a major crane component, such as a mast, a mast stop, a backhitch or a boom stop, is connected indirectly to the rotating bed such that forces directed along a line of action of the major crane component are transferred to the rotating bed through at least one of the drum frames.

20 Claims, 7 Drawing Sheets

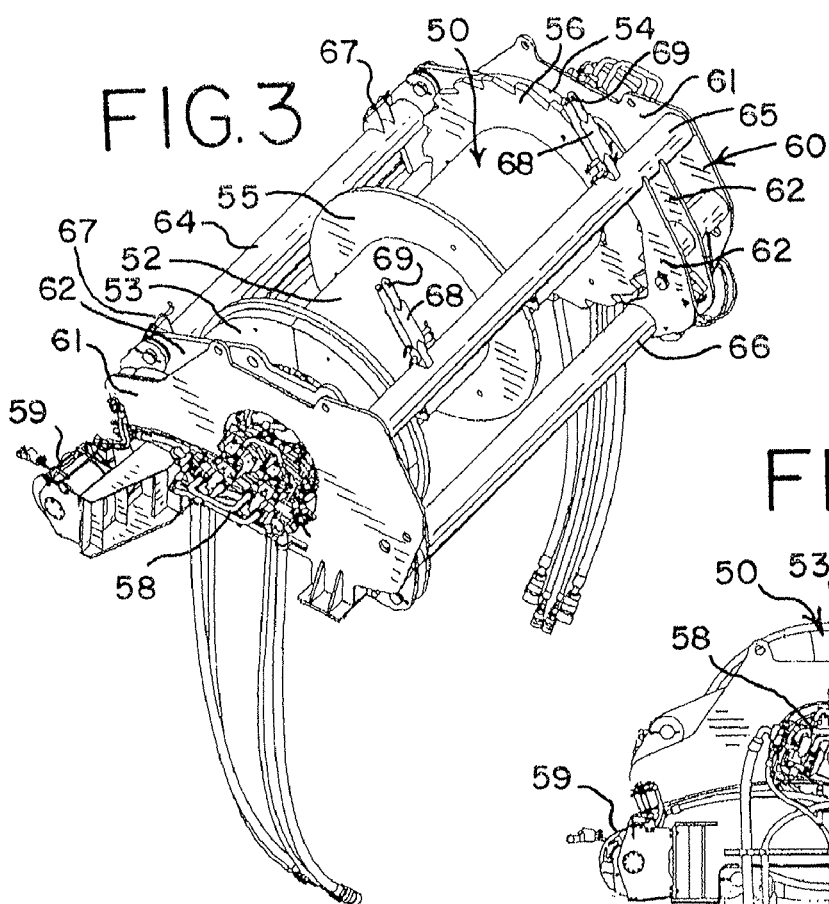
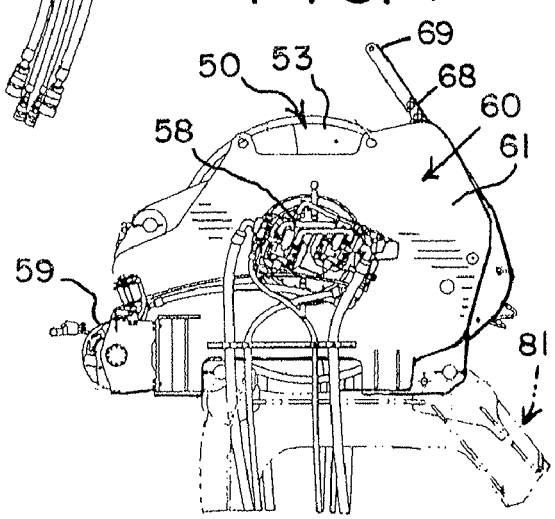
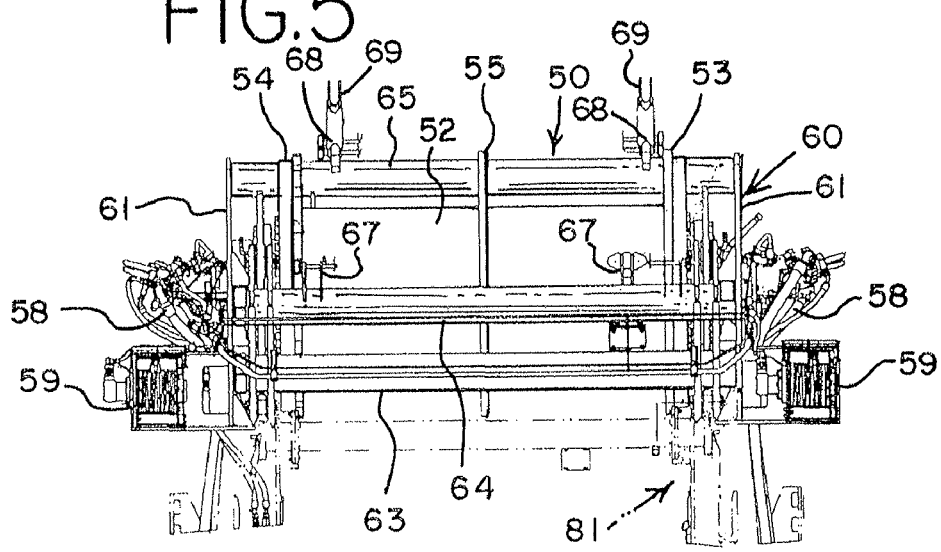

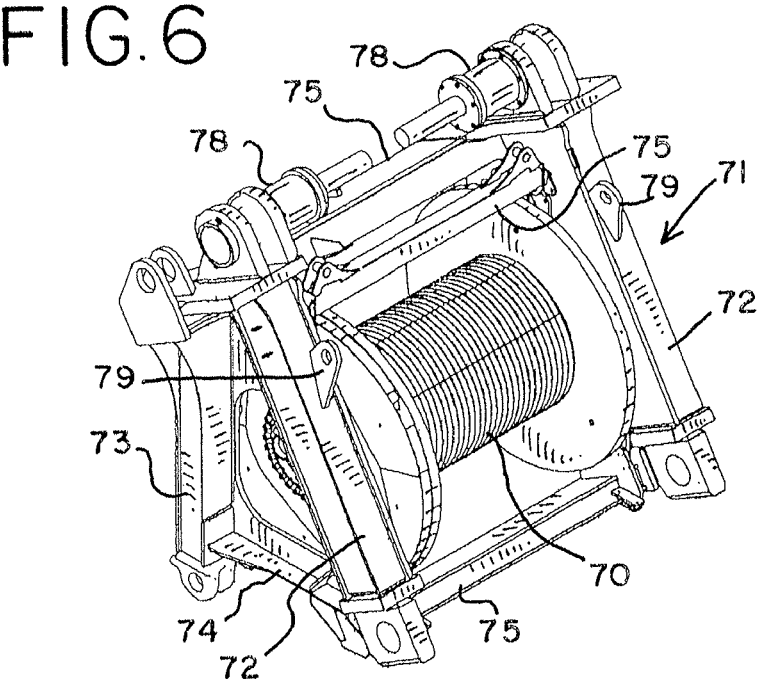
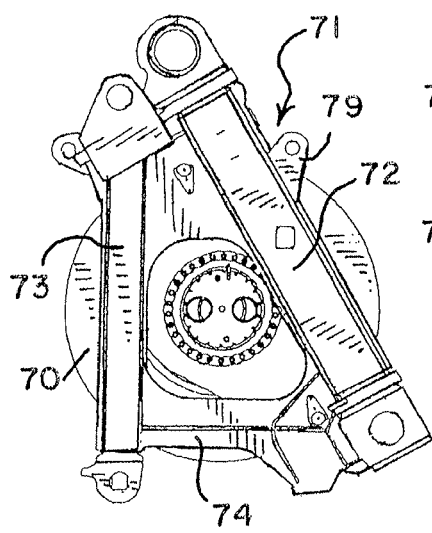
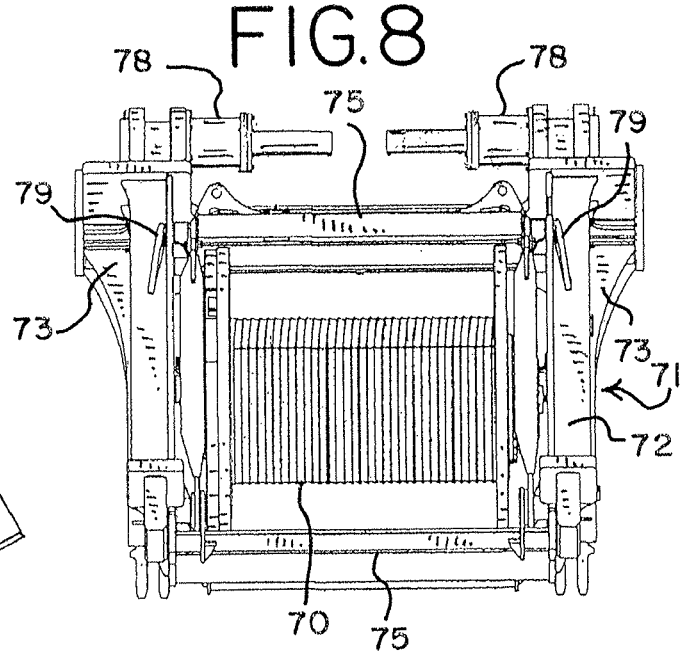

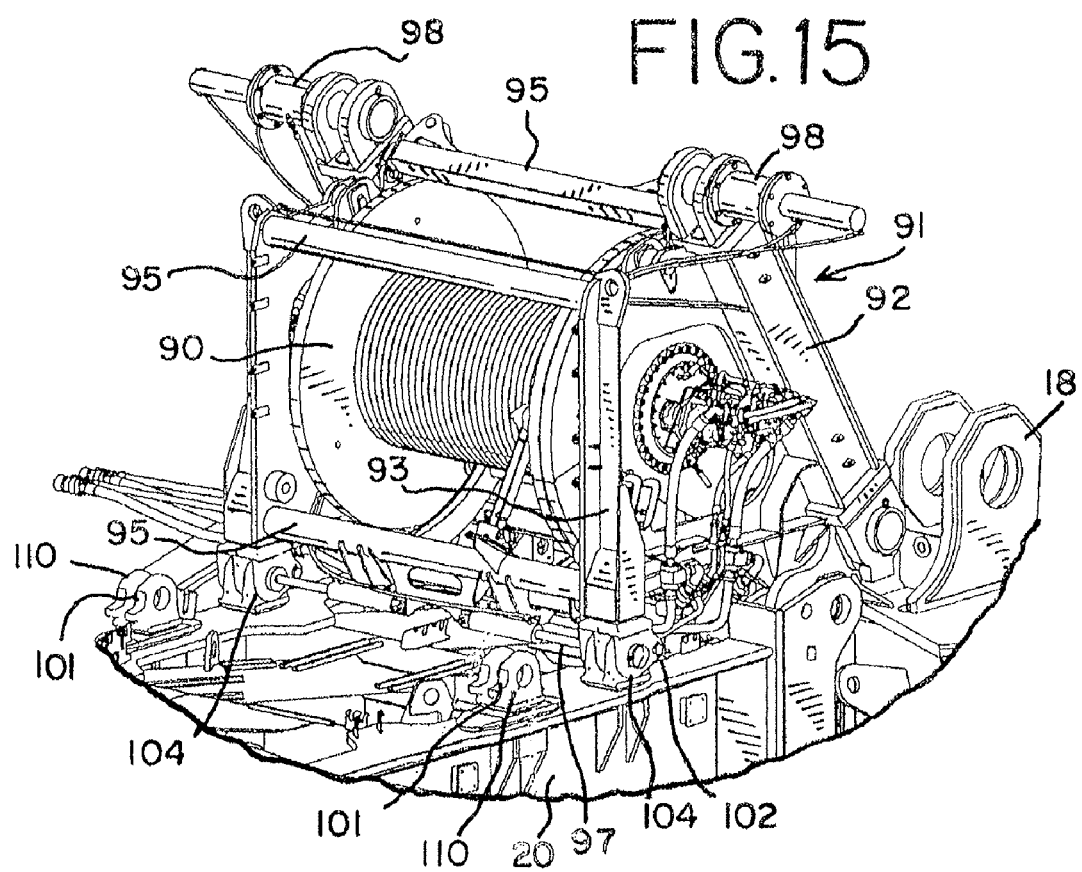

DRUM FRAME SYSTEM FOR CRANES

REFERENCE TO EARLIER FILED APPLICATIONS

The present application claims the benefit of the filing date under 35 U.S.C. §119(e) of Provisional U.S. patent application Ser. No. 61/098,632 filed on Sept. 19, 2008 and of Provisional U.S. patent application Ser. No. 61/155,401 filed on Feb. 25, 2009; both of which are hereby incorporated by reference in their entirety.

BACKGROUND

The present invention relates to a mobile lifting crane that uses multiple hoist drums. These hoist drums may include load hoist drums, such as for lifting a load and an auxiliary or whip line, and boom hoist drums, such as for changing the angle of the boom and changing the angle of a luffing jib.

Mobile lift cranes typically include a carbody having moveable ground engaging members; a rotating bed rotatably connected to the carbody such that the rotating bed can swing with respect to the ground engaging members; a boom pivotally mounted on a front portion of the rotating bed, with a load hoist line extending there from, and counterweight to help balance the crane when the crane lifts a load. Many large capacity cranes include more than one load hoist drum, such as a second main hoist line and an auxiliary or whip line.

There are different ways of changing the angle of the boom with respect to the rotating bed during crane operation, including using hydraulic cylinders mounted between the boom and the rotating bed. However, more commonly a boom hoist drum and rigging are used to change the boom angle. Many cranes also use a mast mounted on the rotating bed to support the rigging, including the boom hoist rigging, so that it may transfer the forces from lifting a load to the rear of the carbody and the counterweight. The boom hoist rigging must carry large tension loads, supporting not only the boom, but counteracting the angled force applied by the boom as it supports the load. The boom hoist rigging includes the boom hoist line extending from the boom hoist drum and reeved through a lower equalizer (which may be attached to the top of the mast), and an upper equalizer with multiple parts of line so that the large tension loads on the rigging are distributed over the multiple parts of line. If the crane is equipped with a luffing jib, the crane will also normally include another boom hoist drum to spool the wire rope used to control the angle of the luffing jib. Thus a large capacity crane may be equipped with four or five hoist drums.

Since the crane will be used in various locations, it needs to be designed so that it can be transported from one job site to the next. This usually requires that the crane be dismantled into components that are of a size and weight that they can be transported by truck within highway transportation limits. For very large cranes, this may require taking the hoist drums off of the rotating bed. The ease with which the crane can be dismantled and set up has an impact on the total cost of using the crane. Thus, to the extent that fewer man-hours are needed to set up the crane, there is a direct advantage to the crane owner. Thus it is beneficial, if the hoist drums are removed, to be able to leave the line on the drums, and to the extent possible, leave the line reeved though as many sheaves as is possible.

Further, when there are a large number of hoist drums on the rotating bed, the rotating bed is typically rather long to provide space for mounting the drums, as well as the other major crane components that are mounted on the rotating bed, such as the mast, the boom stop and any mast stop or backhitch. However, a long rotating bed has disadvantages, primarily because it increases the tail swing of the crane when the crane is being repositioned on the job site. Also, a long rotating bed will inherently have increased weight and manufacturing costs, and may cause additional difficulties if the length exceeds highway transportation limits. Some crane manufacturers have resorted to mounting hoist drums on the boom or mast in order to avoid having a long rotating bed. However, this solution may not be entirely satisfactory, as the hydraulic lines supplying the hoist motors then have to run up the boom or mast, and the drums are harder to access for needed service.

Thus it would be a great advantage if a system could be developed that allowed for a multiple hoist drums to be included on the rotating bed without increasing the length of the rotating bed.

BRIEF SUMMARY

The present invention includes a crane that has a drum frame system that allows multiple drums to be mounted on the rotating bed, along with other crane components, in a compact fashion. The invention also involves a method of transporting and assembling a crane, utilizing the drum frame system.

In a first aspect, the invention is a mobile lift crane comprising a carbody having moveable ground engaging members; a rotating bed rotatably connected to the carbody such that the rotating bed can swing with respect to the ground engaging members; a boom pivotally mounted on the rotating bed; a first hoist drum mounted in a first frame connected to the rotating bed; a second hoist drum mounted in a second frame connected to the rotating bed; and a third hoist drum mounted in a third frame indirectly connected to the rotating bed by being connected to at least one of the first and second hoist drum frames.

In a second aspect, the invention is a mobile lift crane comprising a carbody having moveable ground engaging members; a rotating bed rotatably connected to the carbody such that the rotating bed can swing with respect to the ground engaging members; a boom pivotally mounted on the rotating bed; a first load hoist line trained over a pulley on the boom and wound on a first load hoist drum, the first load hoist drum being mounted in a frame connected to the rotating bed by removable pins, the first load hoist drum and frame thus being detachable from the rotating bed as a combined unit; a boom hoist drum mounted in a frame with a boom hoist line wound on the boom hoist drum, the boom hoist drum frame being connected to the rotating bed by removable pins, the boom hoist drum and frame thus being detachable from the rotating bed as a combined unit; and a first other major crane component connected indirectly to the rotating bed such that forces directed along a line of action of the first other major crane component are transferred to the rotating bed through at least one of the drum frames, wherein the first other major crane component is selected from the group consisting of a mast, a mast stop, a backhitch and a boom stop.

In a third aspect, the invention is a method of assembling a mobile lift crane, the lift crane comprising, during operation, i) a rotating bed, ii) a boom pivotally mounted on the rotating bed, iii) a boom hoist drum mounted in a frame secured to the rotating bed, iv) a first load hoist drum mounted in a frame secured to the rotating bed, and v) a second load hoist drum mounted in a frame secured to the rotating bed, the method comprising: a) pinning two of the drum frames to the rotating bed; and b) stacking and pinning the third hoist drum frame onto at least one of the two drum frames pinned to the rotating bed.

In a fourth aspect, the invention is method of transporting and assembling a mobile lift crane, the lift crane comprising, during operation, i) a rotating bed, ii) a boom pivotally mounted on the rotating bed, iii) a first hoist drum mounted in a frame secured to the rotating bed, iv) a second hoist drum mounted in a frame secured to the rotating bed, and v) at least a first other major crane component selected from the group consisting of a mast, a mast stop, a backhitch and a boom stop, the method comprising: a) transporting the first hoist drum mounted in its frame to a job site; b) transporting the second hoist drum mounted in its frame to the job site; c) transporting the rotating bed to the job site without either of the first hoist drum or second hoist drum being connected to the rotating bed; d) pinning the first hoist drum frame to the rotating bed at the job site; and e) pinning the first other major crane component indirectly to the rotating bed at the job site such that forces directed along a line of action of the major crane component are transferred through the frame of the first hoist drum to the rotating bed.

By utilizing the drum frame system of the present invention, the hoist drums can be stacked on top of each other on the rotating bed, thus allowing multiple drums to be mounted on the rotating bed without having to increase the length of the rotating bed. In a preferred embodiment, first and second main load hoist drums, an auxiliary load hoist drum and a boom hoist drum are all provided with frames that allow the drums to be stacked on top of one another on the rotating bed. Also, utilizing the drum frame system of the present invention, other major crane components that need to be mounted on the rotating bed can be placed at advantageous positions, which also minimizes the length of the rotating bed. These and other advantages of the invention, as well as the invention itself, will be more easily understood in view of the attached drawings.

BRIEF DESCRIPTION OF THE DRAWINGS

FIG. 3 is a perspective view of the boom hoist drum and frame used in the crane of FIG. 1, showing one of the hydraulic motors used to rotate the drum and some associated hydraulic lines.

FIG. 4 is a side elevational view of the boom hoist drum and frame of FIG. 3.

FIG. 5 is a rear elevational view of the boom hoist drum and frame of FIG. 3.

FIG. 6 is a perspective view of the first main load hoist drum and frame used in the crane of FIG. 1.

FIG. 7 is a side elevational view of the first main load hoist drum and frame of FIG. 6.

FIG. 8 is a front elevational view of the first main load hoist drum and frame of FIG. 6.

FIG. 15 is an enlarged perspective view of the auxiliary load hoist drum and frame of FIG. 12 in its operational position on the rotating bed.

DETAILED DESCRIPTION OF THE DRAWINGS AND THE PRESENTLY PREFERRED EMBODIMENTS

Figure 1:
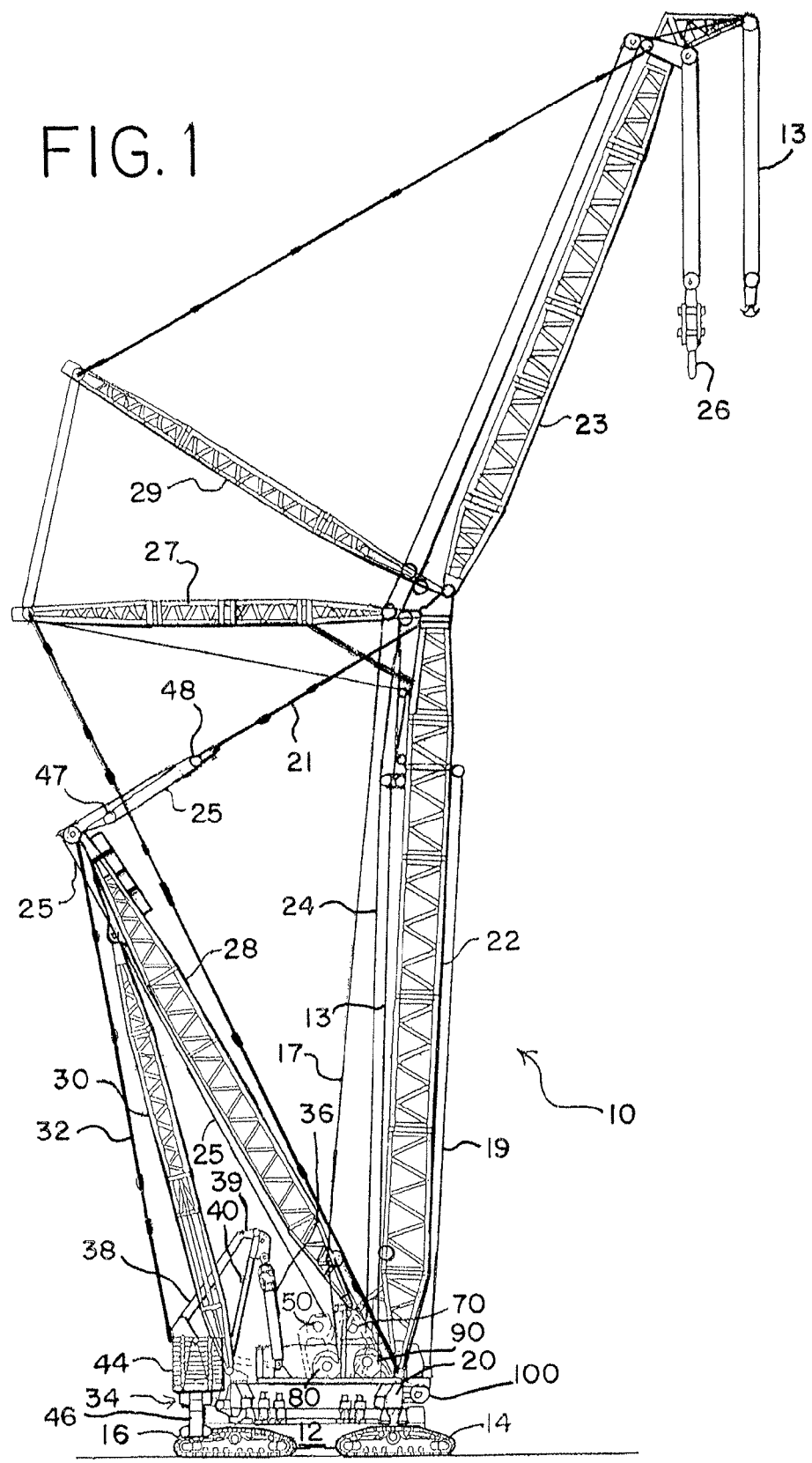
FIG. 1 is a side elevational view of a preferred embodiment of a mobile lift crane utilizing the drum frame system of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The preferred embodiment of the present invention relates to a high capacity mobile lift crane, other aspects of which are disclosed in U.S. Pat. No. 7,546,928 and the following U.S. patent applications assigned to the assignee of the present application: "Mobile Lift Crane With Variable Position Counterweight," Ser. No. 12/023,902, filed Jan. 31, 2008, "Mast Raising Structure And Process For High-Capacity Mobile Lift Crane," Ser. No. 11/740,726, filed Apr. 26, 2007; "Boom Hoist Transportation System And Crane Using Same," Ser. No. 61/098,632 filed Sep. 19, 2008; "Trunnion Transportation System, Carbody Connection System And Crane Using Same," Ser. No. 61/099,098, filed Sep. 22, 2008; "Connection System For Crane Boom Segments," Ser. No. 12/273,310, filed Nov. 18, 2008; "Drive Tumbler And Track Drive For Mobile Vehicles, Including Lift Cranes," Ser. No. 12/368,143, filed Feb. 9, 2009; "Track Connection System For Mobile Vehicles, Including Lift Cranes," Ser. No. 12/368,125, filed Feb. 9, 2009; "Track Tensioning System For Mobile Vehicles, Including Lift Cranes," Ser. No. 12/368,113, filed Feb. 9, 2009; "Crane Hook Block," Ser. No. 61/155,455, filed Feb. 25, 2009; "Carbody Connection System and Crane Using Same," Ser. No. 61/155,440, filed Feb. 25, 2009; "Counterweight Block And Assemblies For Cranes," Ser. No. 61/158,599, filed Mar. 9, 2009; "Swing Drive System For Cranes," Ser. No. 61/155,414, filed Feb. 25, 2009; "Folding Jib Main Strut And Transportable Reeved Strut Caps," Ser. No. 61/165,403, filed Mar. 31, 2009; "Crane Boom Stop," Ser. No. 61/179,935, filed May 20, 2009; and "Crane Backstay Spreader", Ser. No. 61/179,983, filed May 20, 2009. Each of these applications is hereby incorporated by reference.

Several terms used in the specification and claims have a meaning defined as follows.

In preferred embodiments of the invention, certain major crane components may be mounted on the rotating bed indirectly by being mounted to the drum frame system. Those components include the mast, a mast stop, a backhitch and a boom stop. The term "mast" designates a structure used on a rotating bed to hold the boom hoist rigging at a spaced distance from the boom hinge point so that the rigging can have a moment about the boom hinge point, thus allowing the boom angle to be changed. Both fixed masts and moveable masts are common. Other terms are sometimes applied to these structures, such as the term "gantry". Often times the mast will include a sheave set at its top that is part of the equalizer system: an arrangement of sheaves secured together so as to act in concert in spreading tensional force between multiple parts of line. Equalizers are used in pairs. The term "upper equalizer" in a boom hoist rigging arrangement is used to refer to the equalizer closest to the boom top. The term "lower equalizer" is used to refer to the equalizer paired with the upper equalizer but furthest from the boom top. The "lower equalizer" is typically secured to a mast, and may be built into the mast top. This type of lower equalizer is often referred to as a mast top sheave assembly. Some cranes use a live mast, where a fixed length pendant is secured between the boom top and the live mast, and changes in the amount of boom hoist line directly change the angle of the live mast with respect to the rotating bed, which secondarily then changes the angle of the boom with respect to the rotating bed. In that instance the upper equalizer is secured to the top of the mast, and the lower equalizer is secured to the rotating bed at a lower point, such as on a gantry. See, for example, U.S. Pat. application publication No. 2007/0256999. In that document, the embodiment of FIG. 2 has a guy line 44 between the boom top and the mast. In the context of the present definition, both the live mast 40 and the gantry 41 serve as masts.

The term "backhitch" designates a structure that supports the mast in a fixed position during crane operation. It can be a rigid structure that can handle both compression and tension loads, or it may be a pendant that handles tension loads only.

The term "mast stop" designates a structure used to support a mast at an elevated angle compared to the rotating bed. A mast stop is provided primarily so that when no load is on the boom, and the boom hoist rigging is thus not pulling the mast toward the boom, the weight of the mast can be supported.

The term "boom stop" designates a structure used to prevent a boom from tipping over backwards. The boom is designed to operate at angles less than 90° from horizontal. At steep boom angles there is a danger that the boom may go over 90° and start to fall backward, particularly if a load is suddenly released from a hoist line. The boom stop must be designed to handle large forces to either stop the boom from tipping over backward, or fail the boom in severe situations.

The term "hoist drum" designates a winch used to take up and pay out line that is used to lift a load or control a boom angle. For example, a boom hoist drum is used to control the angle of a boom. In this regard, a luffing jib attached to a main boom is also considered a boom, and the drum used to take up and pay out line to control the luffing jib angle is also considered to be a boom hoist drum. A load hoist drum designates a winch used to take up and pay out line that is used to lift a load. Sometimes two load hoist drums are used in concert to lift a load. Many times an auxiliary or whip line is also provided on a load hoist drum on the crane. The hoist drums typically include a cylindrical body on which the hoist line is wound, as well as the mechanical and hydraulic controls for controlling rotation of the cylindrical body. Again, by way of example, in U.S. patent application publication No. 2007/0256999, the hoisting winch 7, with its drum 7a, constitutes an example of a boom hoist drum.

The term "hoist drum frame" designates the structure that is used to hold the hoist drum components together, and to mount them to other crane components. Also, as in the present invention, other components may be mounted to the frame. However, the term "frame" is meant to designate structure that is reasonably close in size to the drum and used for the above enumerated purposes. Thus structure that is used as another major component of a crane, or that is more than twice as long as the cylindrical part of the drum, or more than twice the diameter of the drum, would not be considered part of a frame of the drum. Again, by way of example, in U.S. patent application publication No. 2007/0256999, the brackets holding the shaft 7b constitute part of the frame. However, when the winch 7 is connected to the compressing member 42 as in FIG. 2, or attached to the frames that constitute mast 8 in FIGS. 1A and 1C, the compressing member 42 and the mast 8 are not part of the boom hoist drum frame.

The termed "pinned" (and variations thereof, such as "pinning") is meant to designate a connection between components that allows for the transfer of forces between the components, and also allows the connection to be easily disassembled. Most typically a pinned connection is one that transfers force though shear forces on a pin passing through holes in the two connected structures. In addition to pins, bolts can be used to make a "pinned" connection as that term is used herein.

While the invention will have applicability to many types of cranes, it will be described in connection with mobile lift crane 10, shown in an operational configuration in FIG. 1. The mobile lift crane 10 includes lower works, also referred to as a carbody 12, and moveable ground engaging members in the form of crawlers 14 and 16. There are of course two front crawlers 14 and two rear crawlers 16, only one each of which can be seen from the side view of FIG. 1. In the crane 10, the ground engaging members could be just one set of crawlers, one crawler on each side. Of course additional crawlers than those shown can be used, as well as other types of ground engaging members, such as tires.

A rotating bed 20 is rotatably connected to the carbody 12 such that the rotating bed can swing with respect to the ground engaging members. The rotating bed is mounted to the carbody 12 with a slewing ring, such that the rotating bed 20 can swing about an axis with respect to the ground engaging members 14, 16. The rotating bed supports a boom 22 pivotally mounted on a front portion of the rotating bed; a mast 28 mounted at its first end on the rotating bed, with a lower equalizer 47 connected to the mast adjacent the second end of the mast; a backhitch 30 connected between the mast and a rear portion of the rotating bed; and a moveable counterweight unit 34. The counterweight may be in the form of multiple stacks of individual counterweight members 44 on a support member.

Boom hoist rigging (described in more detail below) between the top of mast 28 and boom 22 is used to control the boom angle and transfer load so that the counterweight can be used to balance a load lifted by the crane. A load hoist line 24 is trained over a pulley on the boom 22, supporting a hook 26. At the other end, the load hoist line is wound on a first main load hoist drum 70 connected to the rotating bed, described in more detail below. The rotating bed 20 includes other elements commonly found on a mobile lift crane, such as an operator's cab, hoist drum 50 for the boom hoist rigging, a second main hoist drum 80 and an auxiliary load hoist drum 90 for a whip line, also described in more detail below. If desired, and as shown in FIG. 1, the boom 22 may comprise a luffing jib 23 pivotally mounted to the top of the main boom, or other boom configurations. When a luffing jib 23 is included, the crane may include first and second jib struts 27 and 29, as well as associated luffing jib rigging and a luffing jib hoist drum 100, which in the embodiment depicted is mounted on the front roller carrier of the rotating bed 20. Luffing jib hoist line 19 runs from drum 100 up to the rigging that controls the angle between jib struts 27 and 29.

The backhitch 30 is connected adjacent the top of the mast 28, but down the mast far enough that it does not interfere with other items connected to the mast. The backhitch 30 may comprise a lattice member, as shown in FIG. 1, designed to carry both compression and tension loads. In the crane 10, the mast is held at a fixed angle with respect to the rotating bed during crane operations, such as a pick, move and set operation.

The counterweight unit 34 is moveable with respect to the rest of the rotating bed 20. A tension member 32 connected adjacent the top of the mast supports the counterweight unit in a suspended mode. A counterweight movement structure is connected between the rotating bed and the counterweight unit such that the counterweight unit may be moved to and held at a first position in front of the top of the mast, and moved to and held at a second position rearward of the top of the mast, described more fully in U.S. patent application Ser. No. 12/023,902.

At least one linear actuation device 36, such as a hydraulic cylinder, or alternatively a rack and pinion assembly, and at least one arm pivotally connected at a first end to the rotating bed and at a second end to the a linear actuation device 36, are used in the counterweight movement structure of crane 10 to change the position of the counterweight. The arm and linear actuation device 36 are connected between the rotating bed and the counterweight unit such that extension and retraction of the linear actuation device 36 changes the position of the counterweight unit compared to the rotating bed. While FIG. 1 shows the counterweight unit in its most forward position, the linear actuation device 36 can be partially or fully extended, which moves the counterweight unit to mid and aft positions, or any intermediate position, such as when a load is suspended from the hook 26.

In the preferred embodiment of the counterweight movement structure, a pivot frame 40, which may be a solid welded plate structure, is connected between the rotating bed 20 and the second end of the linear actuation device 36. The rear arm 38 is connected between the pivot frame 40 and the counterweight unit. The rear arm 38 is also a welded plate structure with an angled portion 39 at the end that connects to the pivot frame 40. This allows the arm 38 to connect directly in line with the pivot frame 40. The backhitch 30 has an A-shape configuration, with spread apart lower legs, which allows the counterweight movement structure to pass between the legs when needed.

The crane 10 may be equipped with a counterweight support system 46, which may be required to comply with crane regulations in some countries. The counterweight movement structure and counterweight support structure are more fully disclosed in U.S. patent application Ser. No. 12/023,902.

The boom hoist rigging includes a boom hoist line in the form of wire rope 25 wound on a boom hoist drum 50, and reeved through sheaves on a lower equalizer 47 and an upper equalizer 48. The boom hoist drum is mounted in a frame 60 (FIG. 2) connected to the rotating bed. The rigging also includes fixed length pendants 21 connected between the boom top and the upper equalizer 48. The lower equalizer 47 is connected to the rotating bed 20 though the mast 28. This arrangement allows rotation of the boom hoist drum 50 to change the amount of boom hoist line 25 between the lower equalizer 47 and the upper equalizer 48, thereby changing the angle between the rotating bed 20 and the boom 22.

The boom hoist drum frame 60, the lower equalizer 47 and the upper equalizer 48 each include cooperating attachment structures whereby the lower and upper equalizers can be detachably connected to the boom hoist drum frame so that the boom hoist drum, the lower equalizer, the upper equalizer and the boom hoist line can be transported as a combined assembly. The combined boom hoist drum 50, frame 60, lower equalizer 47 and upper equalizer 48, arranged as they would be for transportation between job sites, are described in U.S. patent application Ser. No. 61/098,632.

As noted above, in the preferred embodiment of the invention, the crane includes four drums each mounted in a frame and connected to the rotating bed in a stacked configuration. (The rotating bed includes a main frame and front and rear roller carriers.) A fifth drum is mounted in a frame attached to the front surface of the front roller carrier. Frames of two of the four stacked drums are connected directly to the rotating bed, while the frames of the other two drums are indirectly connected to the rotating bed by being directly connected to at least one of the two drum frames connected directly to the rotating bed. In this case, the four stacked drums are preferably the first main load hoist drum 70 with load hoist line 24 wound thereon, the second main load hoist drum 80 with load hoist line 17 wound thereon, the auxiliary load hoist drum 90 with whip line 13 wound thereon, and the boom hoist drum 50 with boom hoist line 25 wound thereon. Preferably the frame 91 of the auxiliary load hoist drum 90 and frame 81 of the second main load hoist drum 80 are connected directly to the rotating bed (the frame 91 pins at its front onto the front roller carrier), the frame 71 of the first main load hoist drum 70 is connected to both of frames 81 and 91, while the frame 60 for the boom hoist drum 50 is connected to frame 81. In that regard, the boom hoist drum frame 60 is thus stacked on top of and pinned directly to the second main load hoist drum frame 81, and the first main load hoist drum frame 71 is stacked on top of and pinned directly to the auxiliary load hoist drum frame 91.

Figure 2:
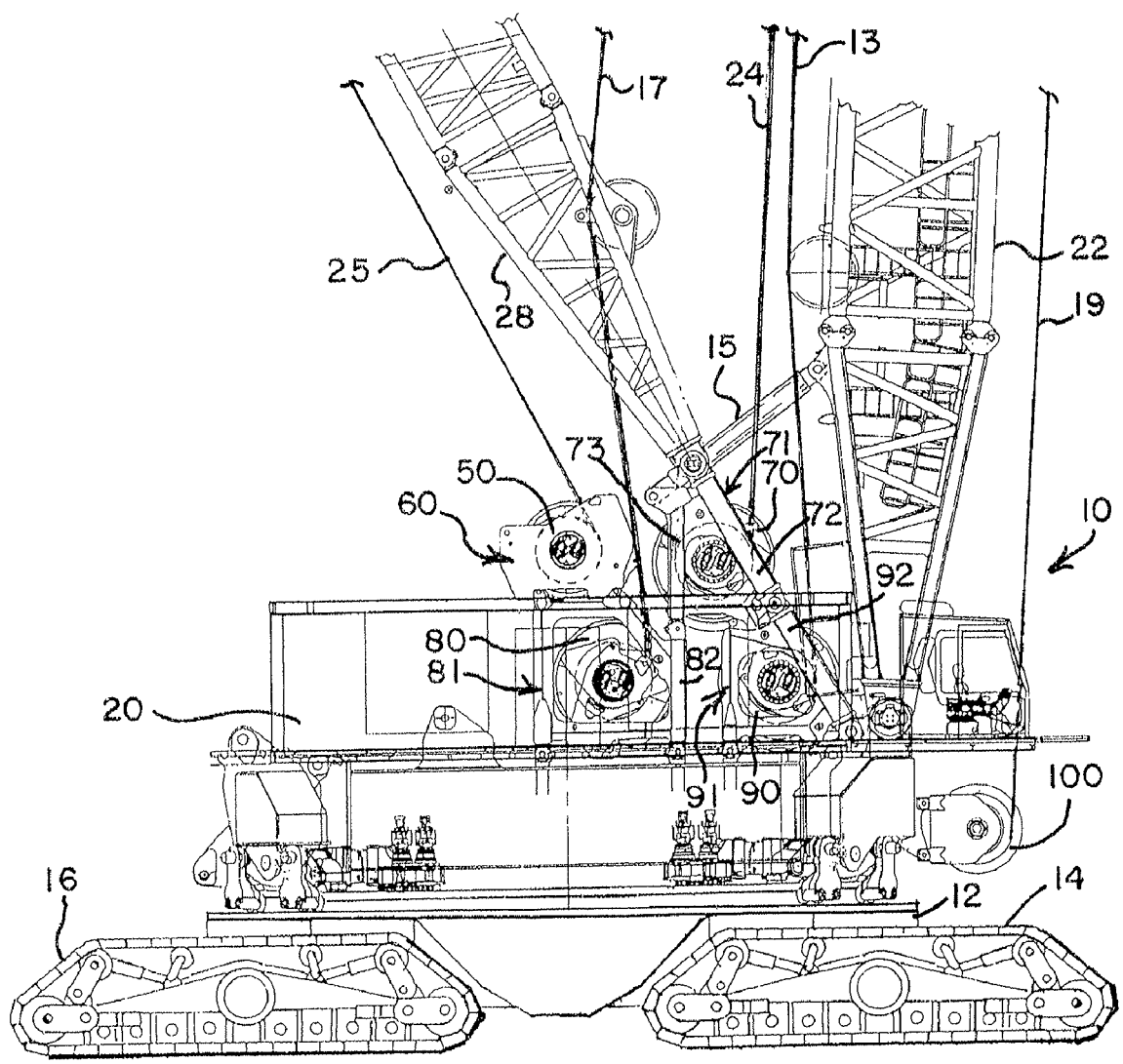
FIG. 2 is an enlarged side elevational view of the crane of FIG. 1 with some of the components removed for sake of clarity.

As best seen in FIG. 2, the drum frames are sized and spaced such that drum 70 is mounted so that the elevation of the lowest portion of the drum 70 is at or above the top most portions of the drums 80 and 90. Drum 50 is likewise held at an elevation above the top most portions of the drums 80 and 90. The drum frames are connected to the rotating bed and to each other by removable pins, allowing the frames to be disconnected from and transported separately from the rotating bed.

The boom hoist drum 50 and frame 60 are best seen in FIGS. 3-5. The wire rope 25 normally found wrapped on the drum 50 is not shown in FIGS. 3-5 for sake of clarity. The boom hoist line 25 is preferably continuously reeved, with both ends of the line being tied off on the boom hoist drum 50. As with conventional boom hoist drums using continuous reeving, the drum 50 (FIG. 3) includes a main cylinder 52 on which the rope 25 is wrapped, with ends 53 and 54, and a separator 55 in the center that separates the two ends of the line as they are wound on the drum. A ratchet and pawl 56 are included to lock the drum when needed. A drive assembly on each end of the drum includes dual variable displacement hydraulic motors 58, each with a spring-set, hydraulic-release brake and appropriate gearing (not shown as they are located inside the drum, as is conventional). (Also, a pair of rear rigging winches 59 are mounted on frame 60. These winches 59 are used to pull the legs of backhitch 30 into position to be pinned during crane assembly.)

The boom hoist drum frame 60 includes end plates 61, and a number of mounting plates 62 of various shapes spaced inwardly from the end plates 61. The frame is tied together with cross bars 63, 64, 65 and 66. The shapes and placement of the mounting plates 62 are dependent on the drive mechanism, brake and other components that are attached to them. These, and other features of the drum, will vary depending on the components used to make up the boom hoist drum, and are not crucial to the invention. However, to mount the equalizers on the frame 60 during transport, the frame is provided with some additional mounting brackets. The top rear cross bar 64 includes two sets of brackets 67 used to mount the lower equalizer 47. The top front cross bar 65 includes two links 68 that extend upwardly along the length of the bar 65, terminating in brackets 69 to which the upper equalizer 48 may be connected.

The first main load hoist drum 70 and its frame 71 are best seen in FIGS. 6-8. The wire rope normally found wrapped on drum 70, and the drive motors, brakes and gear boxes associated therewith, are conventional and are not shown for sake of clarity. The frame 71 has two ends and is generally triangular in shape when viewed from the side. Each end has a main diagonal front leg 72, a vertical rear leg 73 and a bottom cross member 74. The frame ends are tied together with cross bars 75. The legs 72 and 73 have holes at their lower ends for pinning the frame 71 to the frames 81 and 91. The legs also have holes at their upper ends to which other major crane components are pinned, as described in more detail below. The holes at the top of legs 72 have hydraulically operated pin pullers 78 (FIGS. 6 and 8) associated with them. Lifting lugs 79 are mounted on the front legs 72 to allow the drum 70 and frame 71 to be lifted as a combined unit.

Figure 9:
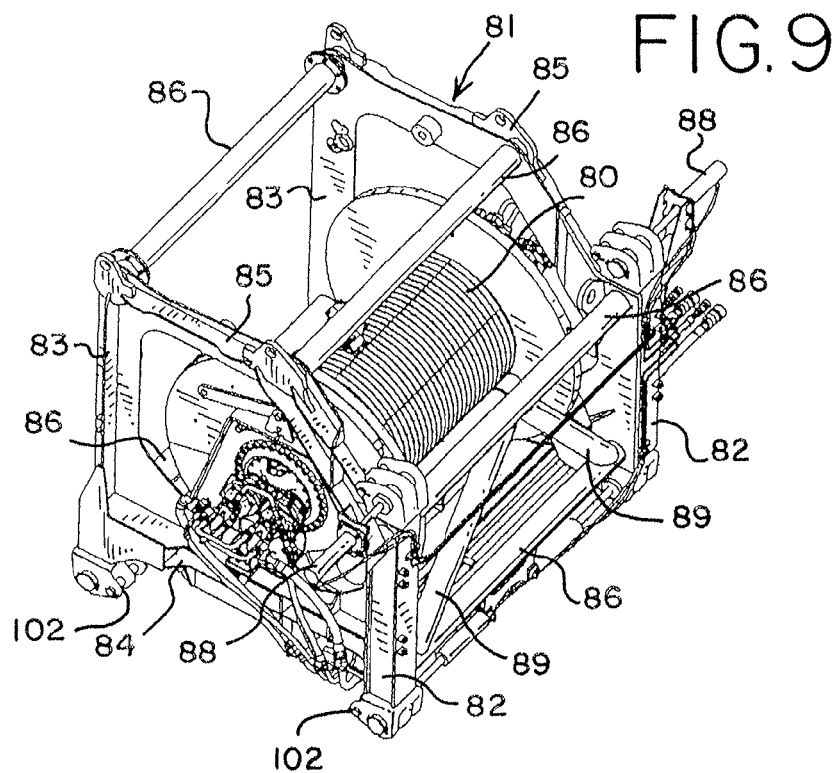
FIG. 9 is a perspective view of the second main load hoist drum and frame used in the crane of FIG. 1, showing one of the hydraulic motors used to rotate the drum and some associated hydraulic lines.
Figure 10:
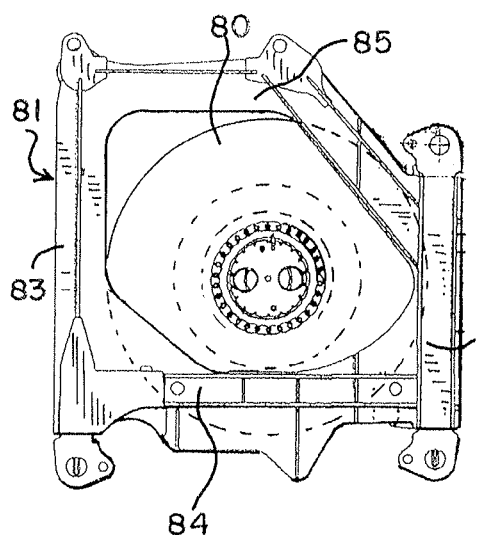
FIG. 10 is a side elevational view of the second main load hoist drum and frame of FIG. 9.
Figure 11:
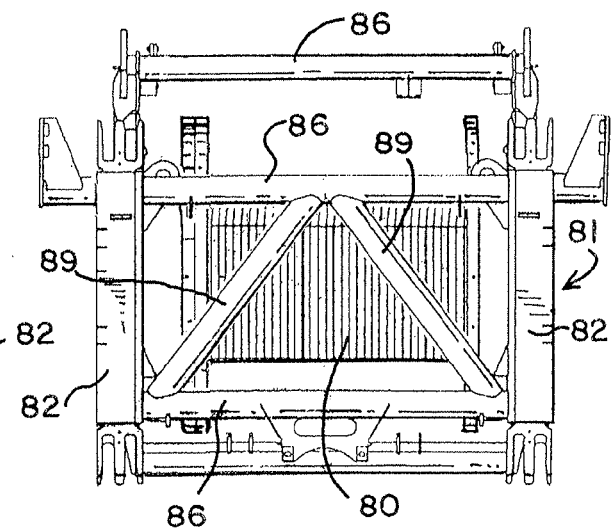
FIG. 11 is a front elevational view of the second main load hoist drum and frame of FIG. 9.

The second main load hoist drum 80 and its frame 81 are best seen in FIGS. 9-11. The wire rope normally found wrapped on drum 80, and the drive motors, brakes and gear boxes associated therewith, are conventional and (except for the drive motor shown in FIG. 9) are not shown for sake of clarity. The frame 81 has two ends and is generally square in shape when viewed from the side. Each end has a vertical front leg 82, a vertical rear leg 83, a bottom cross member 84 and a top member 85 that is angled to provide a bevel form to the front top corner of the otherwise boxed shape frame. The frame ends are tied together with cross bars 86 and two diagonal braces 89 between the cross bars 86 on the front of the frame. The legs 82 and 83 have holes at their lower ends for pinning the frame 81 to the rotating bed 20. The legs 82 have holes at their upper ends to which the frame 71 is pinned during crane assembly. These holes have hydraulically operated pin pullers 88 (FIG. 9) associated with them. The legs 83 and top members 85 contain holes to which the frame 60 is pinned during crane assembly.

Figure 12:
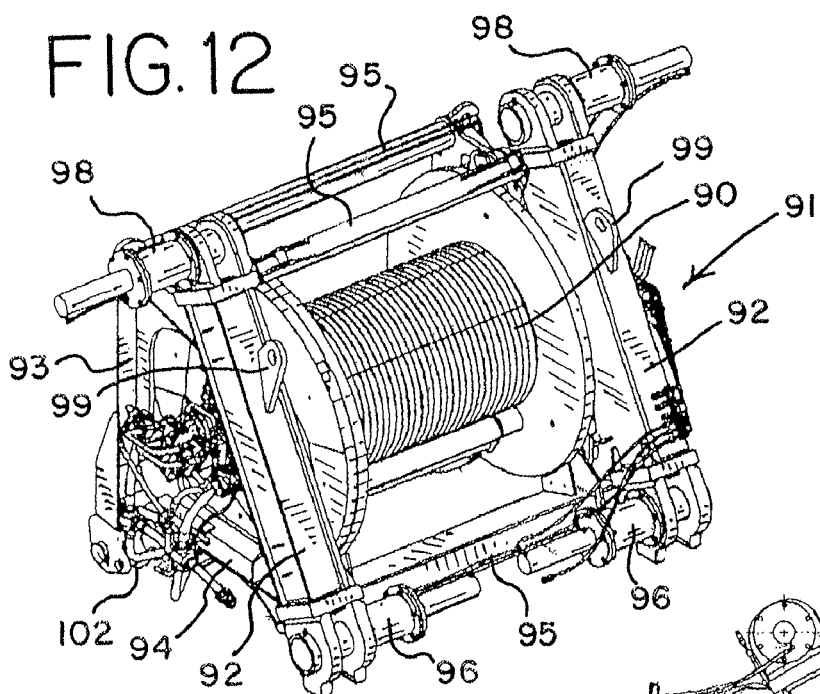
FIG. 12 is a perspective view of the auxiliary load hoist drum and frame used in the crane of FIG. 1, showing one of the hydraulic motors used to rotate the drum and some associated hydraulic lines.
Figure 13:
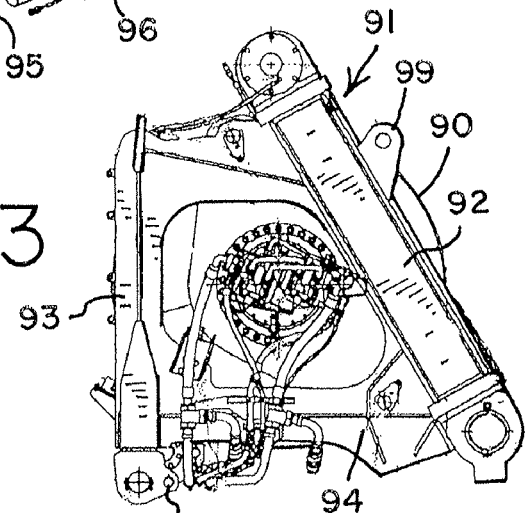
FIG. 13 is a side elevational view of the auxiliary load hoist drum and frame of FIG. 12.
Figure 14:
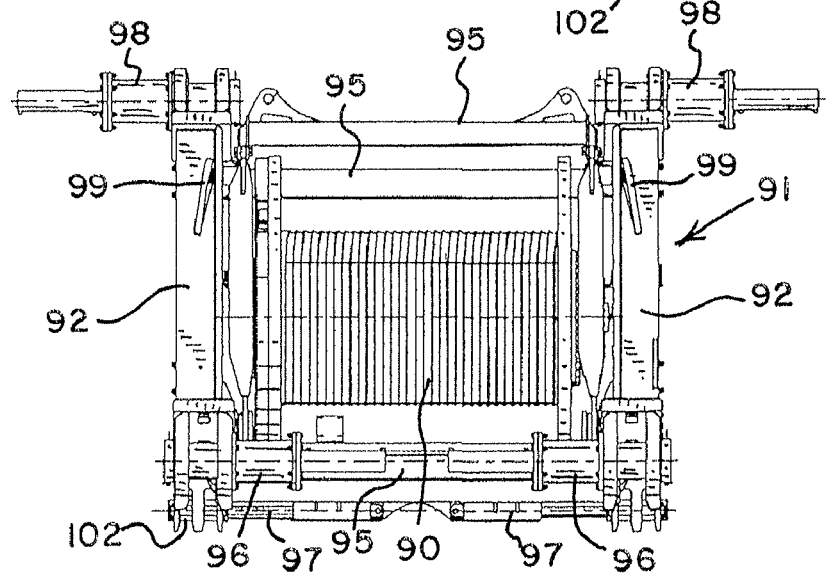
FIG. 14 is a front elevational view of the auxiliary load hoist drum and frame of FIG. 12.

The auxiliary load hoist drum 90 and its frame 91 are best seen in FIGS. 12-14. The wire rope normally found wrapped on drum 90, and the drive motors, brakes and gear boxes associated therewith, are conventional and (except for the drive motors shown in FIGS. 12 and 13) are not shown for sake of clarity. The frame 91 has two ends and is generally triangular in shape when viewed from the side. Each end has a main diagonal front leg 92, a vertical rear leg 93 and a bottom cross member 94. The frame ends are tied together with cross bars 95. The legs 92 and 93 have holes at their lower ends for pinning the frame 91 to the rotating bed. These holes have hydraulic pin pullers 96 and 97 associated with them. The legs 92 also have holes at their upper ends to which frame 71 is pinned during crane assembly. These holes have hydraulic pin pullers 98 associated with them. Lifting lugs 99 are mounted on the front legs 92 to allow the drum 90 and frame 91 to be lifted as a combined unit.

FIG. 15 shows how the frame 91 is pinned to the rotating bed 20 during crane assembly. FIG. 15 also shows the lugs 18 into which the boom foot is pinned to the front roller carrier portion of the rotating bed, and the lugs 110 into which the second load hoist drum frame 81 is pinned to the rotating bed 20. Lugs 110 include a notch 101 that is used for centering the frame 81 as it is lowered into place. A locating pin 102 (FIG. 9) is captured in the end of legs 82 next to the pinning hole. As the leg 82 comes into contact with the lug 110, the locating pin 102 settles into notch 101 and centers the hole in the end of leg 82 with the hole in the lug 110. Similar locating pins 102 are used to mount frame 91 to the rotating bed. As seen in FIGS. 12-14, frame 91 has locating pins 102 at the bottom of rear legs 93 that fit in notches on lugs 104 on the rotating bed (FIG. 15). The frames also include brackets for mounting other devices to the frames, such as pressure roller assemblies and bail limit assemblies (not shown). The pressure roller helps keep the line tight on the drum when rope may be slack, and the bail limit is used to sense the presence of rope on the drum, so that rotation of the drum may be stopped before the last turns of rope are spooled off the drum.

Another aspect of the invention can be seen from FIG. 2. In addition to the load hoist and boom hoist drums being mounted in frames connected to the rotating bed by removable pins so that they can each be detached from the rotating bed as a combined drum and frame unit, the stack of drum frames allows for placement of at least one other major crane component connected indirectly to the rotating bed such that forces directed along a line of action of the other major crane component are transferred to the rotating bed through at least one of the drum frames. The other major crane components for which this invention is most useful include the mast, a mast stop, a backhitch and a boom stop. In the preferred embodiment, both the mast 28 and the boom stop 15 are attached indirectly to the rotating bed 20. In the embodiment shown, the mast 28 is supported by backhitch 30, so a mast stop is not needed. In this embodiment the backhitch is connected directly to the rotating bed rather than indirectly though the drum frame system, but in other crane designs it may be desirable to have a backhitch connected to the rotating bed indirectly through the drum frame system.

The mast 28 carries compressive loads. Thus the line of action of the forces in the mast is directed down the axis of the mast. The connection point of the mast to the drum frame system directs those forces though the drum frame system to the rotating bed 20. In the embodiment shown in FIG. 2 it is easy to see how the compressive load of the mast is carried through the front diagonal legs 72 and 92 of drum frames 71 and 91. The legs 72 and 92 are in a direct line with the axis of the mast.

The boom stop 15 has a line of action through the longitudinal axis of the boom stop. The forces in the boom stop are thus transferred from the boom stop into pins at the top of leg 73 that are in line with the longitudinal axis of the boom stop. The forces at the pins are then transferred to the rotating bed through the geometry of the members of drum frames 71, 81 and 91. If the boom 22 were to recoil backward beyond its maximum designed nearly-vertical position, compressive loads would be transmitted through the boom stop 15 to the pins at the top of leg 73 into the structure of frame 71. That load would be resolved by a compressive force down the legs 73 of frame 71 and legs 82 of frame 81, and a tension load through the legs 72 of frame 71 and legs 92 of frame 91. Thus with the boom stop 15, the forces directed along a line of action of the boom stop are transferred to the rotating bed 20 through three of the drum frames.

The preferred method of assembling the mobile lift crane 10 at a job site utilizes the present invention. In that method, two of the drum frames are pinned to the rotating bed; and a third hoist drum frame is stacked and pinned onto at least one of two drum frames pinned to the rotating bed. In this embodiment, the auxiliary load hoist drum frame 91 and the second main load hoist drum frame 81 are pinned to the rotating bed, and the boom hoist drum frame 60 is pinned to the second main load hoist drum frame 81, and the first main load hoist drum frame 71 is pinned to both the frames 81 and 91.

In another aspect, the invention involves a method of transporting and assembling a mobile lift crane. In this aspect, a first hoist drum mounted in its frame is transported to a job site. A second hoist drum mounted in its frame is also transported to the job site. The rotating bed is transported to the job site without either of the first hoist drum or second hoist drum being connected to the rotating bed. At the job site, the first hoist drum frame is pinned to the rotating bed; and then the other major crane component is pinned indirectly to the rotating bed at the job site such that forces directed along a line of action of the major crane component are transferred through the frame of the first hoist drum to the rotating bed. In the preferred embodiment, each of the drums 50, 70, 80 and 90 are transported in the job site in their respective frames but not attached to the rotating bed 20. The mast 28 and boom stop 15 are both pinned indirectly to the rotating bed at the job site such that forces directed along a line of action of each of the mast and boom stop are transferred through the frame 71 of the first main load hoist drum to the rotating bed 20 through frames 81 and 91. Thus the preferred method comprises pinning a third and fourth hoist drum frame (81 and 91) directly to the rotating bed, and the first main load hoist drum frame 71 is pinned to the rotating bed by being stacked on top of and pinned to the third host drum frame, and the mast and boom stop are both pinned to the first main load hoist drum frame 71. Meanwhile, the boom hoist drum frame 60 is stacked on the second main load hoist drum frame 81, with the frame 60 being pinned to the frame 81.

With the drums stacked in the preferred arrangement and the mast connected at the top of the stack of drum frames as shown in FIG. 2, the wire rope routing is simplified, with few rope guides needed. While the second main hoist line 17 has to run up through the mast 28, the first main hoist line 24 and whip line 13, as well as the boom hoist line 25, do not have to pass though the mast.

One of the advantages of having the mast and boom stop connected indirectly to the rotating bed 20 through the drum frame system is that the rotating bed can be compact, as separate space on the rotating bed does not need to be provided for pinning these other major crane components directly to the rotating bed. In addition, with the mast connection point being elevated to the top of the drum frame stack, the crane can be assembled with the mast being laid out over the rear of the rotating bed, as explained more fully in U.S. patent application Ser. No. 61/098,632.

It should be understood that various changes and modifications to the presently preferred embodiments described herein will be apparent to those skilled in the art. For example, the number of hoist drums on the crane may be more or less than shown. Also, the arrangement of which type of drum (load hoist or boom hoist) is on the top of the stack or on the bottom of the stack can be modified. The frame 91 may be installed without drum 90 being in it when the crane does not need an auxiliary load hoist drum. Also, while the frames 81 and 91 are pinned directly to the weldment of the rotating bed, it is possible in some designs that the lower drum frames would be pinned to an intermediate piece that is connected to the rotating bed. Such changes and modifications can be made without departing from the spirit and scope of the present invention and without diminishing its intended advantages. It is therefore intended that such changes and modifications be covered by the appended claims.

The invention claimed is:

1. A method of transporting and assembling a mobile lift crane, the lift crane comprising, during operation, i) a rotating bed, ii) a boom pivotally mounted on the rotating bed, iii) a first hoist drum mounted in a frame secured to the rotating bed, iv) a second hoist drum mounted in a frame secured to the rotating bed, and v) at least a first other major crane component selected from the group consisting of a mast, a mast stop, a backhitch and a boom stop, the method comprising:
   a) transporting the first hoist drum mounted in its frame to a job site;
   b) transporting the second hoist drum mounted in its frame to the job site;
   c) transporting the rotating bed to the job site without either of the first hoist drum or second hoist drum being connected to the rotating bed;
   d) pinning the first hoist drum frame to the rotating bed at the job site; and
   e) pinning the first other major crane component indirectly to the rotating bed at the job site such that forces directed along a line of action of the major crane component are transferred through the frame of the first hoist drum to the rotating bed.

2. The method of claim 1 wherein the crane further comprises a third hoist drum frame, and the method comprises pinning the third hoist drum frame directly to the rotating bed, and the first hoist drum frame is pinned to the rotating bed by being stacked on top of and pinned to the third host drum frame, and the first other major crane component is pinned to the first hoist drum frame.

3. The method of claim 2 wherein the crane further comprises a fourth hoist drum in a frame, and the method comprises pinning the fourth hoist drum frame to the rotating bed and stacking the second hoist drum frame on the fourth hoist drum frame, with the second hoist drum frame being pinned to the fourth hoist drum frame.

4. The method of claim 2 wherein the third hoist drum frame includes a drum mounted in the frame when the third hoist drum frame is pinned to the rotating bed.

5. The method of claim 1 wherein wire rope on the first hoist drum is rigged to lift a load and wire rope on the second hoist drum is rigged to control the angle of the boom.

6. The method of claim 1 wherein a second other major crane component is also pinned indirectly to the rotating bed at the job site such that forces directed along a line of action of the second other major crane component is transferred through the frame of the first hoist drum to the rotating bed.

7. The method of claim 6 wherein the first other major crane component comprises a mast and the second other major crane component comprises a boom stop.

8. The method of claim 1 wherein the first other major crane component comprises a mast.

9. A method of assembling a mobile lift crane, the lift crane comprising, during operation, i) a rotating bed, ii) a boom pivotally mounted on the rotating bed, iii) a boom hoist drum mounted in a first frame secured to the rotating bed, iv) a first load hoist drum mounted in a second frame secured to the rotating bed, and v) a second load hoist drum mounted in a third frame secured to the rotating bed, the method comprising:
   a) pinning two of the three drum frames to the rotating bed; and
   b) stacking and pinning another of the three drum frames onto at least one of said two drum frames pinned to the rotating bed in step a).

10. The method of claim 9 wherein the second and third drum frames are pinned to the rotating bed and the first drum frame is pinned to the third drum frame.

11. The method of claim 9 wherein the crane further comprising a third load hoist drum mounted in a fourth frame, wherein the second and third drum frames are the two drum frames pinned to the rotating bed, and the first drum frame is stacked on top of and pinned directly to the third drum frame, and the fourth drum frame is stacked on top of and pinned directly to the second drum frame.

12. A mobile lift crane comprising:
a) a carbody having moveable ground engaging members;
b) a rotating bed rotatably connected to the carbody such that the rotating bed can swing with respect to the ground engaging members;
c) a boom pivotally mounted on the rotating bed;
d) a first hoist drum mounted in a first frame connected to the rotating bed;
e) a second hoist drum mounted in a second frame connected to the rotating bed; and
f) a third hoist drum mounted in a third frame indirectly connected to the rotating bed by being attached to at least one of the first and second hoist drum frames.

13. The mobile lift crane of claim 12 wherein the third hoist drum is mounted so that the elevation of the lowest portion of the third hoist drum is above the top most portions of both the first and second hoist drums.

14. The mobile lift crane of claim 12 wherein the first hoist drum comprises a first load hoist drum, and a load hoist line trained over a pulley on the boom is wound on the first load hoist drum; the second hoist drum comprises a second load hoist drum, and a load hoist line trained over a pulley on the boom is wound on the second load hoist drum; and the third hoist drum comprises a boom hoist drum, with a boom hoist line wound on the boom hoist drum.

15. The mobile lift crane of claim 12 further comprising a fourth hoist drum mounted in a frame, with the third hoist drum frame connected directly to at least the second hoist drum frame and the fourth hoist drum frame connected directly to at least the first hoist drum frame.

16. The mobile lift crane of claim 15 wherein the fourth hoist drum frame is pinned to both the first and second hoist drum frames and the third hoist drum frame is pinned to just the second hoist drum frame.

17. The mobile lift crane of claim 12 wherein the drum frames are connected to the rotating bed and to each other by removable pins, allowing the frames to be disconnected from and transported separately from the rotating bed.

18. A mobile lift crane comprising:
a) a carbody having moveable ground engaging members;
b) a rotating bed rotatably connected to the carbody such that the rotating bed can swing with respect to the ground engaging members;
c) a boom pivotally mounted on the rotating bed;
d) a first load hoist line trained over a pulley on the boom and wound on a first load hoist drum, the first load hoist drum being mounted in a first drum frame connected to the rotating bed by removable pins, the first load hoist drum and first drum frame thus being detachable from the rotating bed as a combined unit;
e) a boom hoist drum mounted in a second drum frame with a boom hoist line wound on the boom hoist drum, the second drum frame being connected to the rotating bed by removable pins, the boom hoist drum and second drum frame thus being detachable from the rotating bed as a combined unit; and
f) a first other major crane component connected indirectly to the rotating bed such that forces directed along a line of action of the first other major crane component are transferred to the rotating bed through at least one of the first and second drum frames, wherein the first other major crane component is selected from the group consisting of a mast, a mast stop, a backhitch and a boom stop.

19. The mobile lift crane of claim 18 wherein the major crane component is connected to a third drum frame in which a second load hoist drum is mounted, which in turn is connected to the first drum frame.

20. The mobile lift crane of claim 18 wherein both a mast and a boom stop are connected to the rotating bed by being connected to the at least one drum frame.

* * * * *